United States Patent
Mickens et al.

(10) Patent No.: US 9,553,822 B2
(45) Date of Patent: Jan. 24, 2017

(54) CONSTRUCTING VIRTUAL MOTHERBOARDS AND VIRTUAL STORAGE DEVICES

(71) Applicant: Microsoft Corporation, Redmond, WA (US)

(72) Inventors: James Williamson Mickens, Bellevue, WA (US); Ali Raza Farasat, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

(21) Appl. No.: 14/077,580

(22) Filed: Nov. 12, 2013

(65) Prior Publication Data

US 2015/0134824 A1    May 14, 2015

(51) Int. Cl.
| | |
|---|---|
| *H04L 12/911* | (2013.01) |
| *G06F 9/455* | (2006.01) |
| *G06F 9/50* | (2006.01) |
| *G06F 15/173* | (2006.01) |

(52) U.S. Cl.
CPC .......... *H04L 47/70* (2013.01); *G06F 9/45558* (2013.01); *G06F 9/5027* (2013.01); *G06F 9/5077* (2013.01); *G06F 2009/4557* (2013.01); *G06F 2009/45579* (2013.01)

(58) Field of Classification Search
CPC .... H04L 47/70; G06F 9/45558; G06F 9/5027; G06F 9/5077; G06F 2009/4557
USPC ............................ 709/226; 713/153; 711/154
See application file for complete search history.

(56) References Cited

U.S. PATENT DOCUMENTS

| | | | | |
|---|---|---|---|---|
| 5,838,681 A | * | 11/1998 | Bonomi | H04L 49/25 370/395.41 |
| 7,783,797 B2 | * | 8/2010 | Labute | G06F 3/061 710/310 |
| 8,560,798 B2 | * | 10/2013 | Leggette | G06F 11/1076 711/114 |

(Continued)

OTHER PUBLICATIONS

"Response to International Search Report (ISR) and Written Opinion for PCT Patent Application No. PCT/US/2014/063618", Filed Date: Apr. 15, 2015, 9 pages.

(Continued)

*Primary Examiner* — Emmanuel L Moise
*Assistant Examiner* — Zi Ye
(74) *Attorney, Agent, or Firm* — Alin Corie; Sandy Swain; Micky Minhas (57) ABSTRACT

Described herein are various technologies pertaining to a computing system architecture that facilitates construction of virtual motherboards and virtual storage devices. A computing system includes a plurality of computing nodes and a plurality of storage nodes, where the computing nodes are disaggregated from the storage nodes. The computing nodes include respective system on chip modules. The computing nodes and the storage nodes are communicatively coupled by way of a full bisection bandwidth network, where each storage node is allocated network bandwidth that at least matches the maximum input/output speed of the storage node. Responsive to receipt of a client request, computing nodes are allocated to the client and exposed to an application of the client as a motherboard. Likewise, storage nodes are allocated to the client and exposed to the application of the client as a larger storage device.

20 Claims, 6 Drawing Sheets

(56) References Cited

U.S. PATENT DOCUMENTS

| | | |
|---|---|---|
| 2002/0107678 A1 | 8/2002 | Wu et al. |
| 2003/0131228 A1* | 7/2003 | Twomey ................ H04L 29/06 713/153 |
| 2008/0028408 A1 | 1/2008 | Day et al. |
| 2008/0104694 A1* | 5/2008 | Powell .................... G06F 21/78 726/16 |
| 2010/0058335 A1 | 3/2010 | Weber |
| 2010/0082942 A1 | 4/2010 | Duvalsaint et al. |
| 2010/0250868 A1* | 9/2010 | Oshins ................ G06F 12/0284 711/154 |
| 2010/0268523 A1 | 10/2010 | Dhanwada et al. |
| 2011/0271277 A1* | 11/2011 | Hussain ................ G06F 9/5077 718/1 |
| 2012/0079499 A1* | 3/2012 | Gold .................... G06F 3/0607 718/105 |
| 2012/0110572 A1 | 5/2012 | Kodi et al. |
| 2012/0278400 A1* | 11/2012 | Elson .................... H04L 47/722 709/206 |
| 2013/0166712 A1 | 6/2013 | Chandramouli et al. |
| 2013/0195210 A1 | 8/2013 | Swarbrick et al. |
| 2013/0238912 A1* | 9/2013 | Priel ........................ G06F 1/324 713/300 |
| 2013/0339635 A1* | 12/2013 | Amit ..................... G06F 9/5061 711/154 |
| 2014/0181573 A1* | 6/2014 | Goss ........................ G06F 13/40 714/5.11 |

OTHER PUBLICATIONS

Ready, et al., "Using Virtualization to Maximize Multicore SoC Performance", Published on: Oct. 12, 2011, Retrieved at <<http://embedded-computing.com/articles/using-multicore-soc-performance/>>, pp. 1-3.

Goossens, et al., "Virtual Execution Platforms for Mixed-Time-Criticality Systems: The CompSOC Architecture and Design Flow", ACM SIGBED, 2013, Retrieved at <<http://www.es.ele.tue.nl/~kgoossens/2013-sigbed.pdf, pp. 1-12.

Ruckert, et al., "A Generic Virtual Bus for Hardware Simulator Composition", In IEEE Design & Test of Computers, vol. 26, Issue 5, Sep. 2009, pp. 1-9.

Apacible, et al., "MinuteSort with Flat Datacenter Storage", In Technical Report, Microsoft Research, May 15, 2012, Retrieved at <<http://sortbenchmark.org/FlatDatacenterStorage2012.pdf>>, pp. 1-9.

Singla, et al., "Jellyfish: Networking Data Centers Randomly", In Proceedings of 9th USENIX Conference on Networked Systems Design and Implementation, Apr. 25, 2012, pp. 1-14.

"International Search Report and Written Opinion Issued in PCT Patent Application No. PCT/US2014/063618", Mailed Date: Feb. 5, 2015, 11 pages.

Written Opinion of the International Preliminary Examining Authority for PCT Patent Application No. PCT/US/2014/063618, Mailed Date: Aug. 12, 2015, 6 pages.

"International Preliminary Report on Patentability Issued in PCT Application No. PCT/US2014/063618", Mailed Date: Jan. 25, 2016, 7 Pages.

\* cited by examiner

CONSTRUCTING VIRTUAL MOTHERBOARDS AND VIRTUAL STORAGE DEVICES

BACKGROUND

Cloud operators lease computational resources to clients of the cloud operators, and the clients execute applications using the leased computational resources. This arrangement tends to be mutually beneficial for the cloud operators and the clients. For example, a client has access to relatively high-end computing equipment, which may be prohibitively expensive for the client to purchase and may further be cumbersome for the client to maintain. The cloud operator, due to economies of scale, may be able to purchase a server computing device at a lower price compared to a price the client would have to pay for the server computing device. Furthermore, the cloud operator can employ professionals to maintain the servers and other hardware.

Typically, a client of a cloud operator will set forth a request indicating the computational resources desired by the client when executing a particular application of the client. Oftentimes, the client or the application itself will request "X" amount of processing resources (e.g., a certain number of microprocessor cores or a particular amount of processing capability) and "Y" amount of persistent storage.

To service such requests from multiple clients, cloud operators use data centers, which conventionally comprise several racks of server devices that are communicatively coupled over a local area network (LAN). Each server device comprises a respective central processing unit (CPU), and each CPU has at least one microprocessor core. Each server device additionally includes a respective persistent storage unit, such as hard disk drive (HDD) or solid state drive (SSD). A CPU of a server device resides on a motherboard, and a storage unit of the server device is coupled to the motherboard by way of a bus (e.g., via the Small Computer System Interface (SCSI), Serial Attached SCSI (SAS), Serial Advanced Technology Attachment (SATA), or other suitable interface).

There are numerous deficiencies associated with conventional data centers used by cloud operators to service clients thereof. First, cloud operators have traditionally allocated computational and storage resources in units of physical server devices. A client, however, may request computational resources at a more granular level. Traditionally, the cloud operator has handled such a request by under-utilizing computing resources on server devices in the data center. For example, a client may request processing resources associated with six microprocessor cores of a CPU in a server device of the data center, where the CPU comprises eight cores. Traditionally, the cloud operator allocates the entirety of the server device to the client, which may cause two of the eight microprocessor cores to be fallow.

Second, conventional server devices utilized in data centers include CPUs that consume relatively large amounts of power (about 1000 Watts of thermal dissipation per CPU). This further causes the data center to have cooling costs to maintain an appropriate temperature. Third, componentry of a conventional server device used in a data center is relatively expensive and complex. For example, the server device includes a motherboard, where the motherboard has a CPU thereon that must be connected to additional hardware componentry (e.g., a graphics processing unit (GPU), memory, . . . ). Due to the relatively high cost of the motherboard and componentry thereon, if an individual component of the motherboard (such as the graphics processing unit (GPU)) malfunctions, maintenance costs are incurred by removing the server from the rack, removing the motherboard from the server, removing the faulty GPU from the motherboard, placing a new GPU on the motherboard, testing the motherboard, inserting the motherboard back into the server device, repositioning the server device in the rack, and reconnecting the server device to a local area network (LAN).

SUMMARY

The following is a brief summary of subject matter that is described in greater detail herein. This summary is not intended to be limiting as to the scope of the claims.

Described herein are various technologies pertaining to an exemplary computing system architecture, where a computing system can be a data center, an enterprise server system, etc. An exemplary computing system includes a plurality of computing nodes and a plurality of data storage nodes that are disaggregated—e.g., the computing nodes can be remotely situated from the storage nodes. In such context, the term "remotely situated" is intended to indicate that the computing nodes can write data to and receive data from the storage nodes over network connections, rather than bus connections.

The computing nodes, in an exemplary embodiment, can comprise respective system on chip (SoC) modules, wherein the SoC modules can be homogeneous in nature. Each SoC module comprises at least one respective microprocessor core, a memory (e.g., random access memory (RAM) and/or read only memory (ROM)), and a network interface (e.g., a network interface controller (NIC)). Each SoC module can also optionally comprise a respective graphics processing unit (GPU) and/or other suitable modules. As the term "system on chip" implies, at least one microprocessor core, the local memory, the network interface, and (optionally) the GPU are formed on a single (common) substrate, and therefore reside on a single chip. Additionally, each computing node can additionally comprise a respective local storage module (e.g., a flash memory module) that is operably coupled to at least one microprocessor core of a respective SoC module. For example, the microprocessor core of the SoC module can be operably coupled to the local storage module by way of a bus and associated bus interface.

The above-mentioned data storage nodes can include a hard disk drive (HDD), a solid state drive (SSD), a tape drive, or some suitable combination thereof. Each storage node has a respective input/output (I/O) speed associated therewith. That is, data can be written to and read from a storage node at a particular speed. Generally, HDDs have a lower I/O speed compared to SSDs.

As noted above, the plurality of storage nodes can be operably coupled to the plurality of computing nodes by way of a suitable network connection. Each storage node is allocated bandwidth that at least matches the I/O speed of a respective storage node. Therefore, in an example, if a storage node has an I/O speed of 1 Gb/second, then such storage node is allocated bandwidth of at least 1 Gb/second. Allocation of network bandwidth in this manner ensures that a network connection between a computing node and a storage node does not act as a bottleneck for an application executing on the computing node. In an exemplary embodiment, a network that is used to operably couple the computing nodes and the storage nodes can be a full bisection network; e.g., a network in which any two arbitrary nodes can communicate at the full speeds of their network connections.

Given the above described computing system architecture, virtual motherboards can be constructed at run-time of applications. For example, an application of a client of the cloud operator can specify a certain amount of processing resources and storage resources (the amounts can be arbitrary). The cloud operator can form a virtual motherboard and a virtual storage device responsive to receipt of the specification, wherein the virtual motherboard can be backed by arbitrary, previously unallocated computing nodes (which can be an odd number of computing nodes, and the computing nodes can be positioned on different racks in the computing system), and the virtual storage device can be backed by arbitrary, previously unallocated storage nodes that are disaggregated from the computing nodes. For example, storage nodes can be positioned in different storage racks of the computing system. Since the storage nodes allocated to the application have network bandwidth allocated thereto that is at least as high as the respective I/O speeds of such storage nodes, the virtual motherboard can read data from and write data to the virtual storage device as if the computing nodes were co-located with the storage nodes.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to allocating computing system resources to a client of cloud operator are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
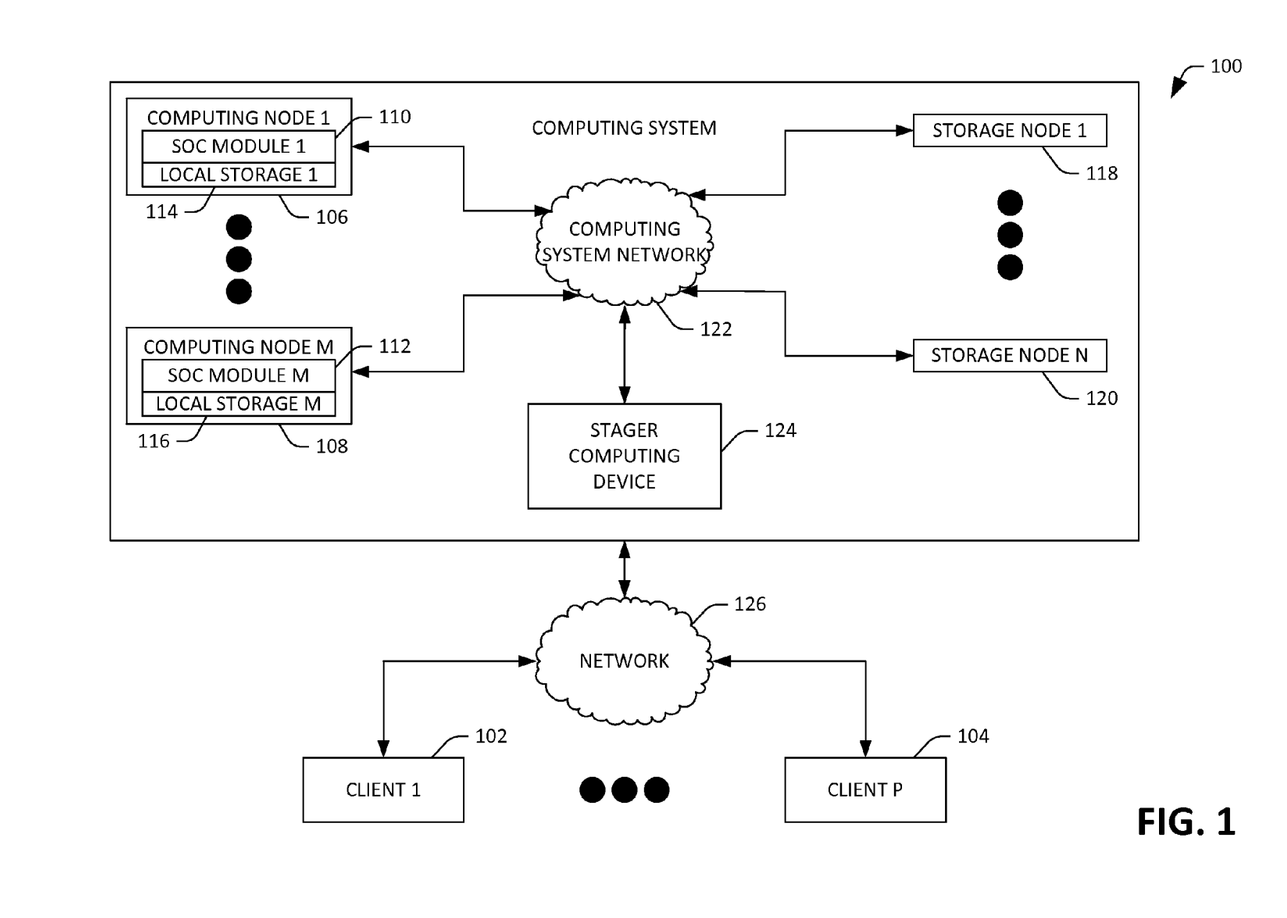
FIG. 1 is a block diagram of an exemplary computing system.

With reference now to FIG. 1, an exemplary computing system 100 that can be used by a cloud operator to provide computing and storage resources to a plurality of clients 102-104 is illustrated. The computing system 100, in an exemplary embodiment, can be a data center, in which case the clients 102-104 may be different respective companies. In another exemplary embodiment, the computing system 100 can be an enterprise server system, in which case the clients 102-104 may be divisions in an enterprise. In yet another exemplary embodiment, the computing system 100 can be a hybrid of a data center and an enterprise server system, where some computing resources are used by the cloud operator to execute enterprise applications (e.g., for internal clients), while other computing resources are used to execute applications of external clients. It is to be understood that the computing system 100 can be any suitable computing system that has the architecture described below.

The computing system 100 includes a plurality of data processing and storage resources, which will be described in greater detail below. The data processing and storage resources are allocated amongst the clients 102-104 based upon requests for such resources from the clients 102-104. Accordingly, in an example, a client may request that an application be executed in the computing system 100 that is configured to execute queries over a database maintained in the computing system 100. To that end, the client or the application can request or specify a particular amount of processing resources in connection with executing queries over the database, and can further request or specify a particular amount of storage to retain the database. As will be described in greater detail below, the computing system 100 has an architecture that facilitates servicing relatively granular requests from clients and applications, and further facilitates increased utilization of hardware when compared to conventional data center architectures.

The computing system 100 comprises a plurality of computing nodes 106-108. The plurality of computing nodes 106-108 comprise a respective plurality of system on chip (SoC) modules 110-112. Each SoC module in the plurality of SoC modules 110-112 comprises at least one respective microprocessor core, a respective memory module that is accessed by the respective microprocessor core, and a respective network interface that acts to interface a computing node with other modules of the computing system 100. Additionally, optionally, each SoC module in the plurality of SoC modules 110-112 can comprise a respective graphics processing unit (GPU) that can access the respective local memory module on the respective SoC module. The at least one microprocessor core, the local memory, the network interface, and (optionally) the GPU are formed on a single (common) semiconductor substrate—that is, the at least one microprocessor core, the local memory, the network interface, and (optionally) the GPU reside on a single chip.

The plurality of computing nodes 106-108 also optionally comprises a respective plurality of local storage modules 114-116. The local storage modules can be operably coupled to the SoC modules 110-112 by way of respective bus connections (e.g., via SCSI, SAS, SATA, . . . ). In an exemplary embodiment, the local storage modules 114-116 can be a suitable form of computer-readable data storage, such as RAM, ROM, DRAM, SRAM, PROM, EPROM, EEPROM, etc. In another example, the local storage modules 114-116 can be flash storage modules.

In an exemplary embodiment, the computing nodes 106-108 may be homogeneous in nature. In another example, the plurality of computing nodes 106-108 may comprise heterogeneous computing nodes. The computing nodes 106-108 can be placed in racks in the computing system 100 at selective positions to facilitate ambient cooling of the computing nodes 106-108. For example, the plurality of computing nodes 106-108 can be vertically stacked with space between adjacent computing nodes being between 1 inch and 3 inches, thereby facilitating airflow between computing nodes. This arrangement can enable deployment across a variety of computing system types, including air cooling and water-side cooling. In each of these arrangements the transfer of heat between nodes will occur within the space between such nodes.

The computing system 100 further comprises a plurality of storage nodes 118-120. The storage nodes 118-120 can be or include hard disk drives (HDDs), solid state drives (SSDs), tape drives, or other suitable storage devices.

The computing system 100 further includes a computing system network 122, over which the computing nodes 106-108 can transmit data to and retrieve data from the storage nodes 118-120. In an exemplary embodiment, the network 122 can be a full bisection bandwidth network. A full bisection bandwidth network is a network that, regardless of where the network 122 is dissected, nodes on one side can send data at full bandwidth to nodes on the other side, and vice versa. This property allows for an arbitrary computing node or subset of arbitrary computing nodes from the plurality of computing nodes 106-108 to transmit and receive data at full bandwidth to and from an arbitrary storage node or subset of arbitrary storage nodes from the plurality of storage nodes 118-120.

In an exemplary embodiment, each storage node in the plurality of storage nodes 118-120 can have a respective network bandwidth allocated thereto that is equal to or greater than the I/O speed of a respective storage node. For example, if the first storage node 118 is a HDD with an I/O speed of 1 Gb/second, network bandwidth allocated to the first storage node 118 is at least 1 Gb/second. In another example, if the nth storage node 120 is a SSD, and has an I/O speed of 3 Gb/second, network bandwidth allocated to the nth storage node 120 is at least 3 Gb/second. The network 122 comprises suitable network equipment and has a topology that allows for such network 122 to be a full bisection bandwidth network. Thus, the network 122 can include routers, switches, cabling, devices that facilitate optical communication, etc.

The computing system 100 can further include a stager computing device 124 that is configured to allocate computing nodes and/or storage nodes to the clients 102-104 (e.g., applications to be executed for the clients 102-104) responsive to receipt of requests for processing resources and/or storage resources from at least one of the clients 102-104 or the applications. In an exemplary embodiment, the first client 102 can transmit a request to the computing system 100 by way of a network 126 (e.g. the Internet), wherein the request is for processing resources corresponding to two computing nodes and storage resources corresponding to three storage nodes. The stager computing device 124 can receive the request and access a database maintained at the computing system 100 that identifies which of the computing nodes 110-112 have not been allocated and which of the storage nodes 118-120 have not been allocated. When there are a sufficient number of unallocated computing nodes and storage nodes to service the request from the first client 102, the stager computing device 124 can allocate the requisite number of computing nodes (from amongst the unallocated computing nodes) and the requisite number of storage nodes (from amongst the unallocated storage nodes) to the first client 102.

Thus, continuing with this example, the stager computing device 124 can aggregate two (arbitrary) computing nodes in the plurality of computing nodes 106-108 responsive to receipt of the request from the first client 102, thereby generating a virtual motherboard. Such virtual motherboard presents a single virtual execution platform to an application of the first client 102. Likewise, the stager computing device 124 can create a virtual storage device by aggregating three previously unallocated (arbitrary) storage nodes for the first client 102. The stager computing device 124 can dynamically bundle the storage nodes for the application of the first client 102 at runtime.

It is again to be noted that the computing nodes 110-112 and the storage nodes 118-120 are disaggregated in the computing system 100. That is, the computing nodes 110-112 can be positioned in a first set of racks, and the storage nodes 118-120 can be positioned in a second set of racks that is non-identical to the first set of racks. The computing nodes allocated to the first client 102 can be positioned on different racks, and the storage nodes allocated to the first client 102 can be positioned on different racks. The high-bandwidth of the network 122 allows for the computing nodes allocated to the first client 102 to be, in a sense, arbitrary, as the computing nodes need not be co-located on a same rack. The same holds true for the storage nodes. A similar process can be undertaken with respect to the pth client 104. In other words, the pth client 104 can submit a request to the computing system 100, wherein the request indicates a desired amount of processing resources and a desired amount of storage resources. The stager computing device 124 can select unallocated computing nodes and unallocated storage nodes to service the request, creating for the pth client 104 a virtual motherboard backed by the computing nodes and a virtual storage device backed by the storage nodes.

The exemplary computing system 100 exhibits numerous advantages over conventional data centers and enterprise server systems. For example, the computing system 100 may be associated with more efficient resource utilization compared to conventional data centers and enterprise server systems, as processing resources and storage resources can be allocated to client at a relatively granular level. For instance, conventionally, a data center is unable to adequately service a request from a client for an odd number of microprocessor cores. In an example, in a conventional data center, if an application of a client that is to be executed at the data center sets forth a request for processing resources corresponding to three microprocessor cores, the data center may deny the request or allocate four microprocessor cores to the client, thereby causing one of the processor cores to be fallow while still consuming power. In contrast, the computing system 100 facilitates creation of virtual motherboards that can be backed by an arbitrary number computing nodes from amongst the plurality of computing nodes 106-108, selected from arbitrary locations in the computing system 100.

Therefore, if the application of the client requests processing resources corresponding to an odd number of microprocessor cores, the stager computing device 124 can create a virtual motherboard for the application that is backed by the odd number of computing nodes. Similarly, if the application of the client requests processing resources corresponding to an even number of processor cores, the stager computing device 124 can create a virtual motherboard for the application that is backed by the even number of computing nodes. Likewise, the architecture of the computing system 100 facilitates creation of virtual storage devices that can be backed by an arbitrary number of storage nodes from amongst the plurality of storage nodes 118-120, selected from arbitrary locations in the computing system 100.

In addition, the computing system 100 can be associated with simplified administration. Specifically, since the computing nodes are disaggregated from the storage nodes, entire racks or containers of homogeneous computing nodes and/or storage nodes can be placed in the computing system 100 or removed from the computing system 100 at once. In contrast, updating computing or storage resources of traditional aggregated servers requires specialized maintenance (e.g., for each server).

Still further, the computing system 100 can be associated with a reduction in power consumption compared to conventional data centers or enterprise server systems. For instance, the computing nodes 106-108 may have similar power needs, as the computing nodes 106-108 may be homogeneous. Furthermore, as noted above, the computing nodes 106-108 can be laid out to maximize ambient cooling.

Figure 2:
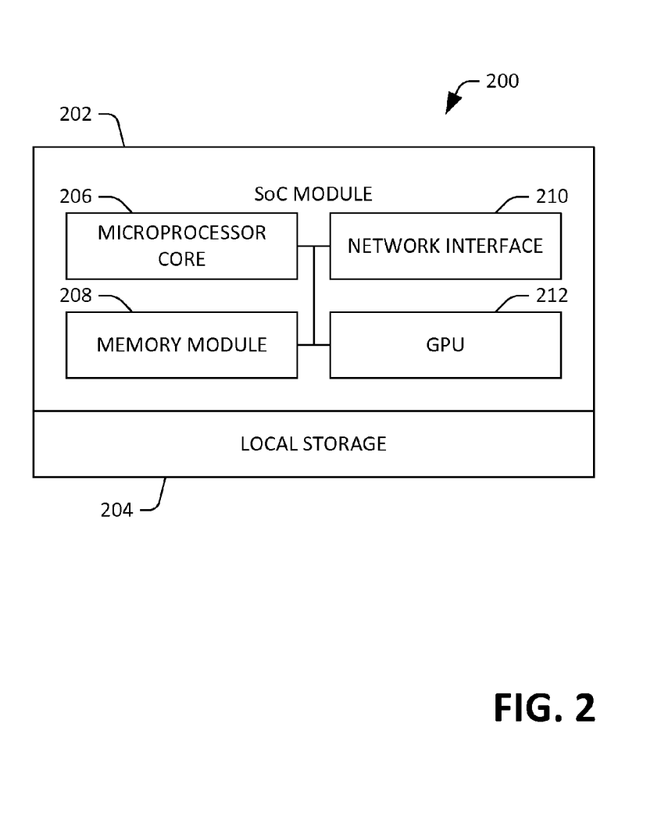
FIG. 2 illustrates an exemplary computing node that can be included in the computing system.

With reference now to FIG. 2, an exemplary computing node 200 in the plurality of computing nodes 106-108 is illustrated. The computing node 200 includes a SoC module 202 and associated local storage 204. The SoC module 202 includes a microprocessor core 206, a memory 208, a network interface 210, and (optionally) a GPU 212. The microprocessor core 206 and/or the GPU 212 can be operably coupled to the local storage 204 by way of a bus. It can be ascertained that the microprocessor core 206, the memory 208, the network interface 210, and the GPU 212 are formed on a single common semiconductor substrate. In an exemplary embodiment, the computing node 200 can be placed in a container or rack with a plurality of other homogeneous computing nodes. For example, the rack may include 10 computing nodes (which are homogeneous with the computing node 200), wherein each computing node is provided with a network connection having a particular amount of bandwidth. For instance, each computing node may have at least a 1 Gb/second Ethernet connection.

Figure 3:
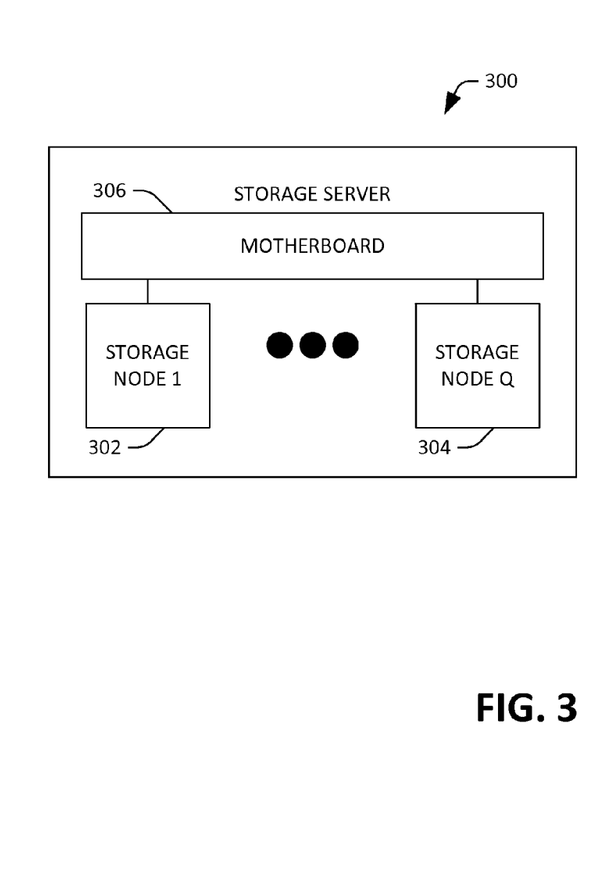
FIG. 3 is a block diagram of a storage device that can include at least one storage node.

With reference to FIG. 3, an exemplary storage server 300 is illustrated. The storage server 300 may comprise a plurality of storage nodes 302-304, wherein the storage nodes 302-304 may be homogeneous storage nodes. For example, the storage nodes 302-304 may be a plurality of SSDs. Furthermore, in an example, the computing system 100 may include two or more different types of storage servers: a first storage server that includes SSD storage nodes, and a second storage server that includes HDD storage nodes. The storage server 300 can include a motherboard 306, wherein the motherboard 306 can include a native CPU chipset that provides SATA ports for the storage nodes 302-304. As noted above, the storage nodes 302-304 can be connected to the computing nodes 106-108 over the computing system network 122 (e.g., a full bisection bandwidth network). The storage server 300 is provided with a sufficient amount of network bandwidth, such that each storage node therein can be read from and written to at full speed over the network 122. The full bisection bandwidth network that can match storage speeds with network speeds creates a locality oblivious storage substrate. That is, any computing node can access any storage device at full speed, regardless of their respective locations in the computing system 100.

Figure 4:
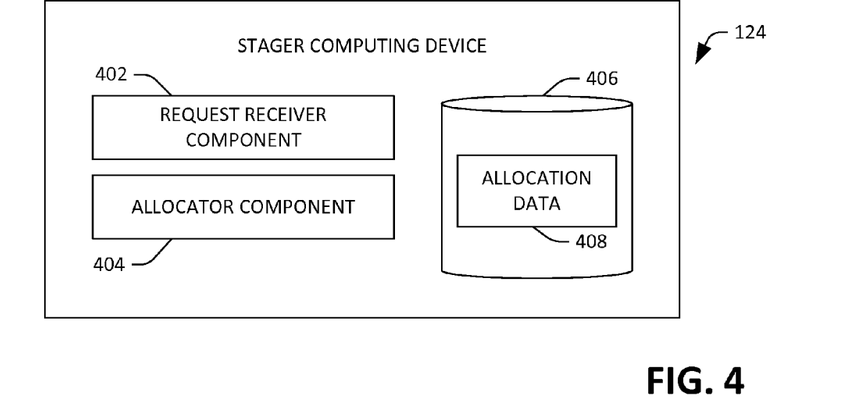
FIG. 4 is a functional block diagram of an exemplary stager computing device that can be included in the computing system.

Now referring to FIG. 4, a functional block diagram of the stager computing device 124 is illustrated. The stager computing device 124 includes a request receiver component 402 that receives a request from at least one of the clients 102-104. As noted above, the request can indicate an amount of processing resources and/or storage resources desired by the client for executing an application on computing nodes and storing data on storage nodes of the computing system 100. The stager computing device 124 further comprises an allocator component 404 that can allocate computing nodes and/or storage nodes from the computing nodes 106-108 and the storage nodes 118-120 to service the request from the client.

To that end, the stager computing device 124 can include a data store 406 that comprises allocation data 408. The allocation data 408 can indicate which of the computing nodes 106-108 and which of the storage nodes 118-120 are not already allocated to clients of the cloud operator. The allocator component 404 can select a subset of the computing nodes 106-108 for allocation to the client that can service the request, wherein computing nodes in such subset are not allocated to other clients of the cloud operator. Likewise, the allocator component 404, through analysis of the allocation data 408, can identify a subset of storage nodes from the storage node 118-120 that are not allocated to other clients of the cloud operator and that can service the request from the client. The allocator component 404 can then allocate the subset of storage nodes to the client.

Accordingly, when an application is to be executed on behalf of the client, the stager computing device 124 can create a virtual motherboard and a virtual storage device for the application to use. The allocator component 404 provides the application with enough computing nodes and storage nodes to meet its computational and storage needs. The allocator component 404 can expose the virtual motherboard and the virtual storage system in a variety of manners. For example, the computing nodes can be exposed as a virtual non-uniform memory access (NUMA) motherboard, in which microprocessor cores communicate using a virtual bus layered atop their respective network connections (e.g., 1 Gb/second Ethernet connections). The physical disks can be exposed to an application using one or more virtual disks, such that each virtual disk is backed by one or more physical storage nodes.

Figure 5:
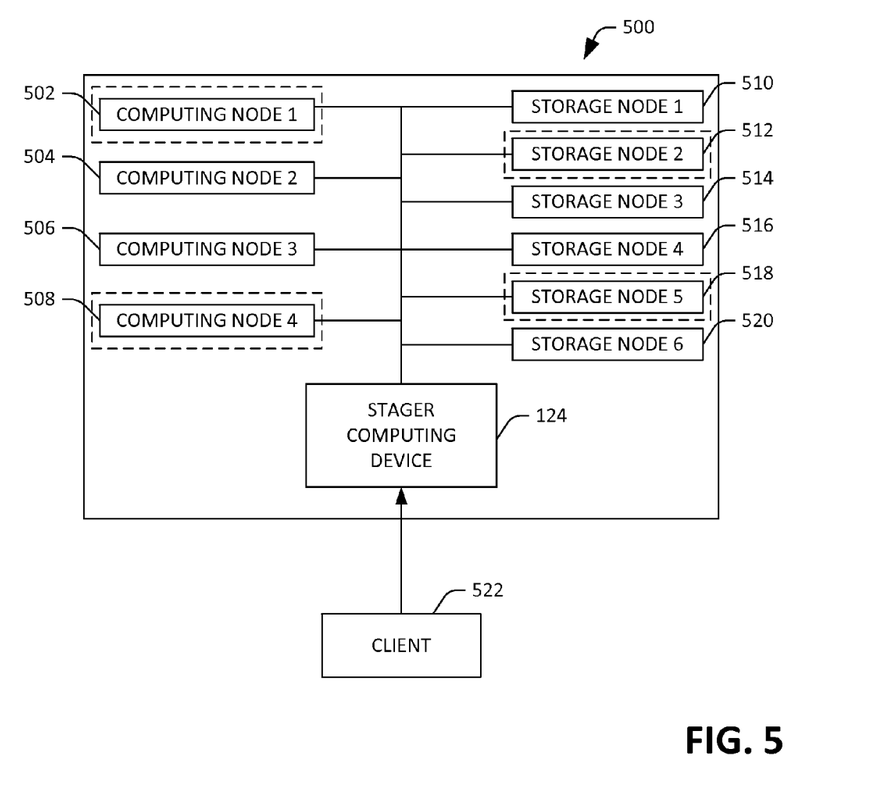
FIG. 5 illustrates an exemplary virtual motherboard created at runtime of an application of a client of a cloud operator.

Now referring to FIG. 5, exemplary creation of a virtual motherboard and a virtual storage device is illustrated. A computing system 500 includes four computing nodes 502-508 and six storage nodes 510-520. The stager computing device 124 receives a request from a client 522, wherein the request pertains to an application being executed using the resources of the computing system 500. For example, the request can indicate that the application needs processing resources of two computing nodes, and the request can further indicate that the application needs storage resources corresponding to two storage nodes. The stager computing device 124 can ascertain that the first computing node 502 and the fourth computing node 508 are unallocated, while the computing nodes 504 and 506 have been allocated to another client (e.g., another application is utilizing the computing nodes 504 and 506). The stager computing device 124 can cause a virtual motherboard to be constructed that is backed by the first computing node 502 and the fourth computing node 508, which were previously unallocated. It can be ascertained that the first computing node 502 and the fourth computing node 508 are not shown as being adjacent to one another in the computing system 500. Such computing nodes 502 and 508 can be arbitrarily located in the computing system 500.

The stager computing device 124 can further ascertain that the first storage node 510, the third storage node 514, the fourth storage node 516, and the six storage node 520 have been allocated to at least one other client of the cloud operator, while the second storage node 512 and the fifth storage node 518 are unallocated. The stager computing device 124 can then construct a virtual storage device that is backed by the previously unallocated storage devices 512 and 518. Again, it is noted that the storage nodes 512 and 518 need not be co-located in the computing system 500. For instance, the storage nodes 512 and 518 may be located in separate storage servers. The application may then be executed using the computing nodes 502 and 508, wherein the application is provided with an address or addresses corresponding to the storage nodes 512 and 518.

Figure 6:
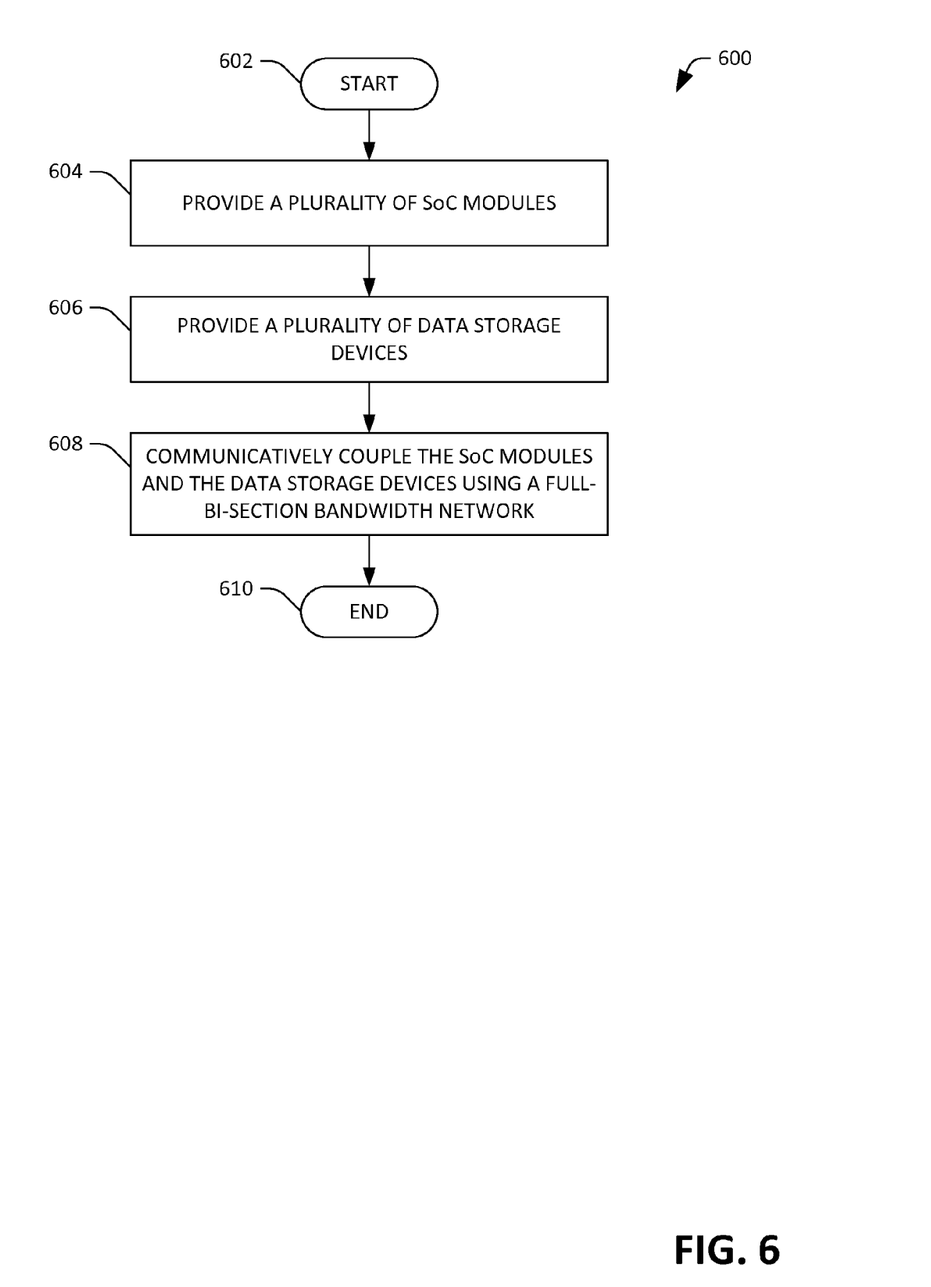
FIG. 6 is a flow diagram illustrating an exemplary methodology for designing a computing system having a particular architecture.
Figure 7:
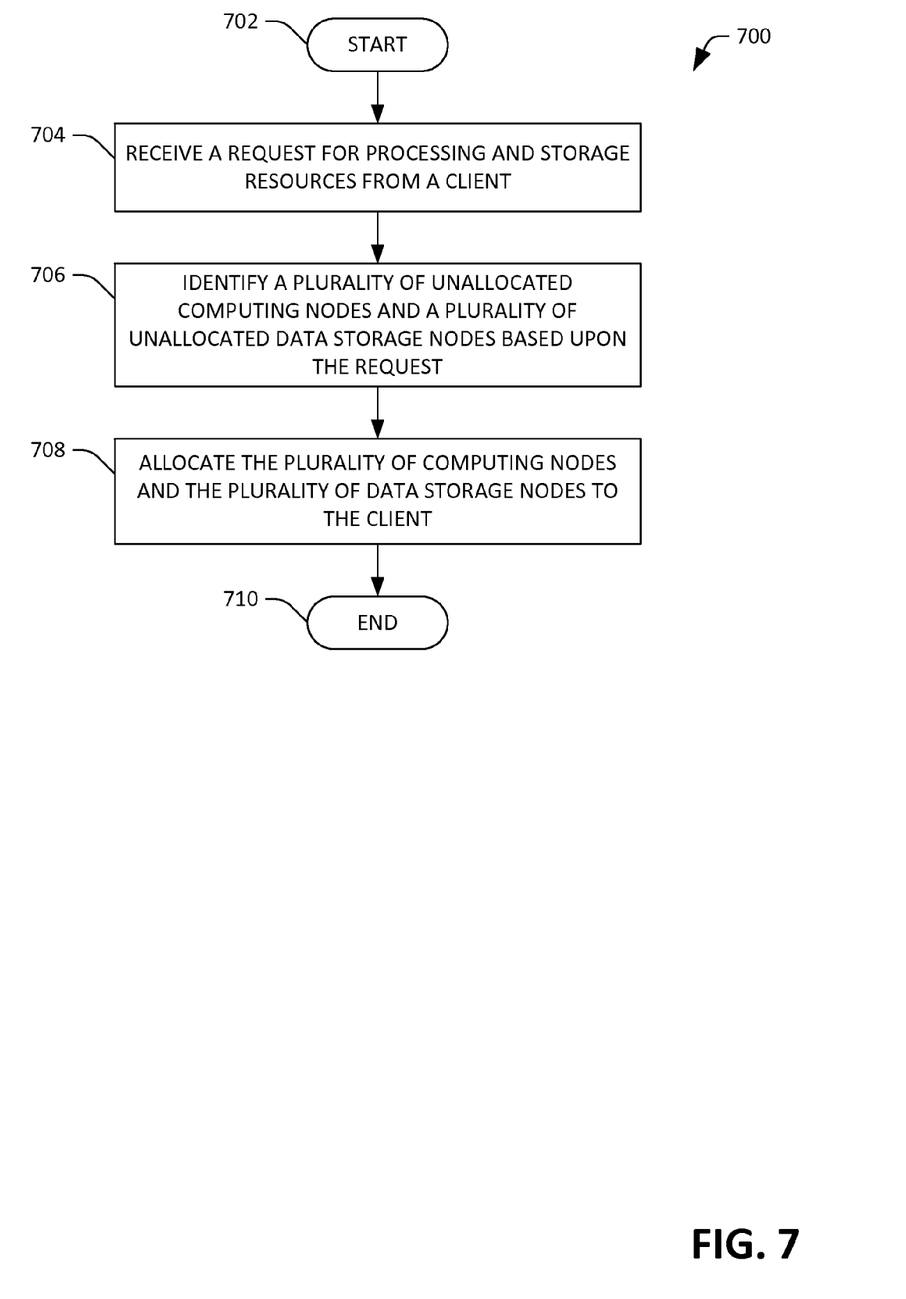
FIG. 7 is a flow diagram illustrating an exemplary methodology for constructing a virtual motherboard and a virtual storage device responsive to receipt of a request from a client.

FIGS. 6-7 illustrate exemplary methodologies relating to computing systems and constructing virtual motherboards and virtual storage devices. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 6, an exemplary methodology 600 for designing a computing system is illustrated. The methodology 600 starts at 602, and at 604 a plurality of SoC modules are provided. As noted above, a SoC module includes a microprocessor core, a memory, and a network interface. At 606, a plurality of data storage nodes are provided. With more specificity, a plurality of storage server devices can be provided, wherein each storage server device includes a respective plurality of data storage nodes. At 608, the SoC modules and the data storage nodes are communicatively coupled using a full bisection bandwidth network. As noted above, each storage node can be allocated bandwidth that corresponds to its maximum I/O speed. The methodology 600 completes at 610.

Now referring to FIG. 7, an exemplary methodology 700 for constructing a virtual motherboard and a virtual storage device is illustrated. The methodology 700 starts at 702, and at 704 a request for processing and storage resources is received at a computing system from a client of an operator of the computing system. The request includes data that indicates processing resources and/or storage resources for executing an application for the client at the computing system. At 706, a plurality of unallocated computing nodes are identified responsive to receiving the request at 704. As noted above, each computing node comprises a SoC module. Additionally, a plurality of unallocated storage nodes are identified responsive to receiving the request. At 708, the plurality of computing nodes and the plurality of storage nodes are allocated to the client. With more specificity, the plurality of computing nodes are stitched together to form a virtual motherboard, and the plurality of storage nodes are stitched together to form a virtual storage device. The virtual motherboard executes the application, transmitting data to and retrieving data from the virtual storage device. Accordingly, the plurality of computing nodes can be exposed to the client as a virtual NUMA motherboard. Data that identifies the storage nodes can be provided to the plurality of computing nodes, thereby allowing the computing nodes to transmit data to and retrieve data from the storage nodes when executing the application for the client. Alternatively, another layer of abstraction can be provided, where the computing nodes are provided with contiguous address space that is then mapped to the storage nodes. Furthermore, as indicated above, each storage node is allocated network bandwidth corresponding to its maximum I/O speed. Therefore, the plurality of storage nodes are allocated bandwidth corresponding to the aggregate of the maximum I/O speeds of such storage nodes. The methodology 700 completes at 710.

Figure 8:
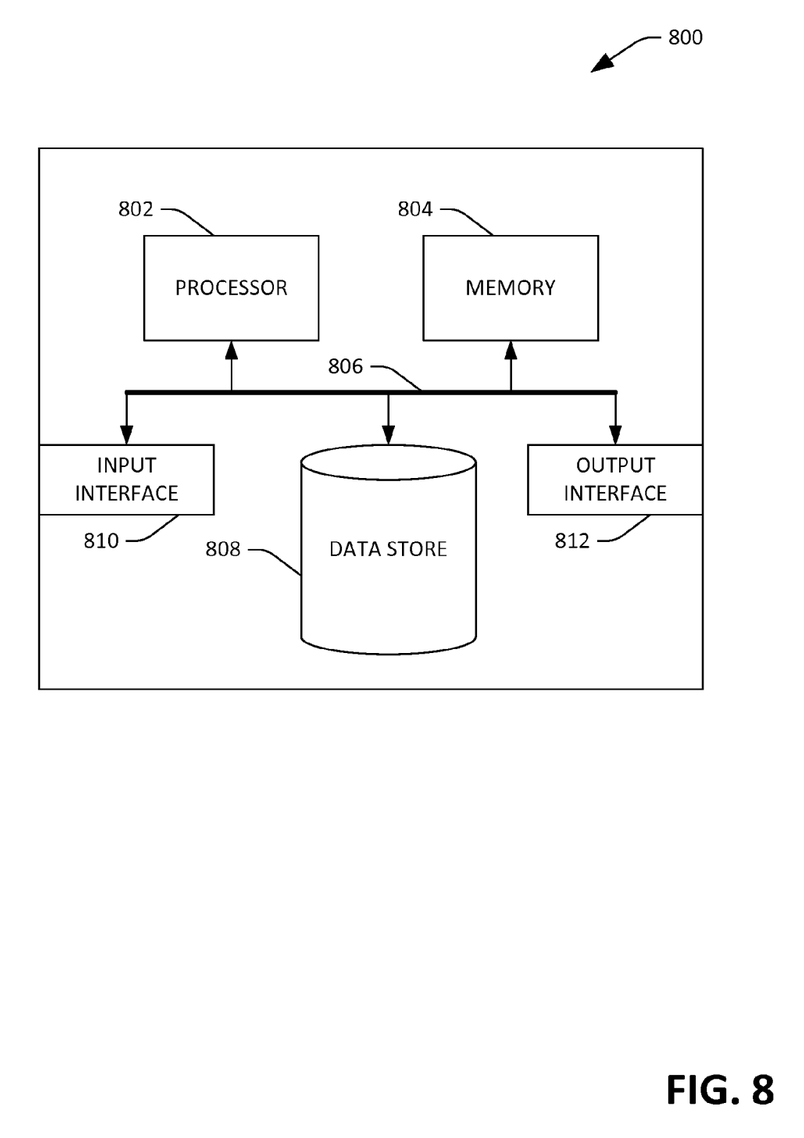
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be used in a system that supports allocating computing nodes and storage nodes to a client of a cloud operator. By way of another example, the computing device 800 can be used in a system that supports constructing a virtual motherboard and/or a virtual storage device. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store resource allocation data.

The computing device 800 additionally includes a data store 808 that is accessible by the processor 802 by way of the system bus 806. The data store 808 may include executable instructions, allocation data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SoCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system that is configured to service requests of a plurality of clients, the computing system comprising:
   a plurality of System on Chip (SoC) modules, each SoC module in the plurality of SoC modules comprising:
      a microprocessor core;
      a memory module that is accessed by the microprocessor core; and
      a network interface that interfaces a SoC module to at least one other device, wherein the microprocessor core, the local memory, and the network interface are formed on a common substrate;
   a plurality of data storage nodes remotely situated from the plurality of SoC modules, where the plurality of data storage nodes are in communication with the plurality of SoC modules by way of a network, the data storage nodes allocated respective network bandwidths based upon input/output speeds of the plurality of data storage nodes; and
   a stager computing device that receives a request for computing resources and storage resources from a client and, responsive to receiving the request, allocates a plurality of unallocated SoC modules from the plurality of SoC modules and a plurality of unallocated data storage nodes from the plurality of data storage nodes to the client.

2. The computing system of claim 1, the plurality of SoC modules being homogeneous.

3. The computing system of claim 1, the network being a full bisection bandwidth network.

4. The computing system of claim 1, wherein each data storage node in the plurality of data storage nodes is allocated a network bandwidth that at least matches a maximum input/output speed of the data storage node.

5. The computing system of claim 1, the request indicating an amount of processing resources, the stager computing device allocates the plurality of unallocated SoC modules to the client responsive to receipt of the request.

6. The computing system of claim 5, wherein the request is for an odd number of microprocessor cores, and wherein the stager computing device allocates the plurality of unallocated SoC modules such that the odd number of microprocessor cores are allocated to the client.

7. The computing system of claim 5, wherein the request from the client further indicates an amount of data storage resources, the stager computing device allocates the plurality of unallocated data storage nodes to the client responsive to receipt of the request.

8. The computing system of claim 5, wherein the subset of SoC modules executes an application of the client.

9. The computing system of claim 1, further comprising a plurality of local storage modules that are respectively coupled to the plurality of SoC modules by way of respective buses.

10. The computing system of claim 9, the plurality of local storage modules comprising flash memory modules.

11. The computing system of claim 1, the plurality of data storage nodes comprising at least one of a hard disk, a solid state drive, or a tape drive.

12. A method, comprising:
receiving, at a stager computing system, a request from a client of the stager computing system, the request comprising data that indicates processing resources for executing an application for the client and data storage resources to be used by the application; and
responsive to receiving the request, identifying a plurality of unallocated SoC modules of a computing system and a plurality of unallocated data storage nodes of the computing system, the plurality of unallocated SoC modules comprising the processing resources indicated in the request, the plurality of unallocated data storage nodes comprising the data storage resources indicated in the request, each SoC module in the plurality of SoC modules comprising:
a respective microprocessor core;
a respective local memory module that is accessed by the respective microprocessor core; and
a respective network interface that interfaces a respective SoC module to at least one other device, the respective microprocessor core, the respective local memory module, and the respective network interface formed on a common substrate, wherein the plurality of unallocated SoC modules and the plurality of unallocated data storage modules are in communication by way of a network, the plurality of unallocated data storage nodes allocated respective network bandwidths based upon input/output speeds of the plurality of unallocated data storage nodes; and
responsive to identifying the plurality of unallocated SoC modules and the plurality of unallocated data storage nodes, allocating the plurality of SoC modules to the client for executing the application.

13. The method of claim 12, further comprising exposing the plurality of unallocated SoC modules to the client as a virtual non-uniform memory access (NUMA) motherboard.

14. The method of claim 12, further comprising providing address space that maps at least one storage node in the plurality of unallocated storage nodes to at least one SoC module in the plurality of SoC modules, wherein the at least one SoC module transmits data to and retrieves data from the at least one storage node by way of the address space when executing the application for the client.

15. The method of claim 14, wherein a network connection between the plurality of unallocated SoC modules and the plurality of unallocated storage nodes has a bandwidth that corresponds to an aggregate I/O speed of the plurality of unallocated storage nodes.

16. The method of claim 15, wherein the network connection is a portion of a full bisection bandwidth network.

17. The method of claim 12, wherein each SoC module in the plurality of SoC modules has a respective local memory attached thereto by way of a respective bus.

18. The method of claim 12, wherein the request indicates that an odd number of microprocessor cores are desired by the client, and wherein allocating the plurality of SoC modules comprises allocating the odd number of microprocessor cores to the client.

19. A computing system comprising:
a plurality of System on Chip (SoC) modules, each SoC module in the plurality of SoC modules comprises:
a microprocessor;
a local memory that is accessed by the microprocessor core; and
a network interface that interfaces the SoC module that comprises the network interface to at least one other device in the computing system, the microprocessor core, the local memory, and the network interface residing on a single chip;
a plurality of storage nodes that are communicatively coupleable to the plurality of SoC modules over a full bisection bandwidth network; and
a stager computing device that receives a request for computing resources and storage resources from a client and, responsive to receiving the request, allocates a plurality of unallocated SoC modules and a plurality of unallocated storage nodes to the client, wherein bandwidth of a network connection between the plurality of unallocated SoC modules and the plurality of unallocated storage nodes is at least an aggregate of maximum I/O speeds of the plurality of unallocated storage nodes.

20. The computing system of claim 19, wherein the plurality of unallocated SoC modules are exposed to the client as a virtual non-uniform memory access (NUMA) motherboard.

* * * * *